(12) United States Patent
Lee et al.

(10) Patent No.: US 7,313,333 B2
(45) Date of Patent: Dec. 25, 2007

(54) APPARATUS FOR CONTROLLING DECISION THRESHOLD VOLTAGE TO OPTICAL RECEIVER

(75) Inventors: Jyung Chan Lee, Daejeon (KR); Seung Il Myong, Daejeon (KR); Joon Ki Lee, Daejeon (KR); Kwang Joon Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 612 days.

(21) Appl. No.: 10/815,064

(22) Filed: Mar. 31, 2004

(65) Prior Publication Data

US 2005/0135818 A1    Jun. 23, 2005

(30) Foreign Application Priority Data

Dec. 18, 2003    (KR)    ........................ 10-2003-0092823

(51) Int. Cl.
*H04B 10/06* (2006.01)
(52) U.S. Cl. ........................ 398/209; 398/204; 398/206; 398/208
(58) Field of Classification Search ................ 398/209
See application file for complete search history.

(56) References Cited

U.S. PATENT DOCUMENTS

| | | | | |
|---|---|---|---|---|
| 4,097,697 A | * | 6/1978 | Harman | 714/704 |
| 4,509,050 A | * | 4/1985 | Amoroso et al. | 342/91 |
| 4,622,586 A | * | 11/1986 | Megeid | 348/532 |
| 5,146,079 A | | 9/1992 | Lisco | |
| 5,636,048 A | * | 6/1997 | Kogure et al. | 398/202 |
| 5,818,620 A | * | 10/1998 | Akimoto et al. | 398/209 |
| 5,917,639 A | | 6/1999 | Ushirozawa | |
| 6,081,362 A | | 6/2000 | Hatakeyama et al. | |
| 6,151,150 A | | 11/2000 | Kikuchi | |

(Continued)

OTHER PUBLICATIONS

IEE Proceedings, vol. 136, pt. J, No. 3, Jun. 1989, pp. 169-176.

(Continued)

*Primary Examiner*—Kenneth Vanderpuye
*Assistant Examiner*—Thi Q. Le
(74) *Attorney, Agent, or Firm*—Blakely, Sokoloff, Taylor & Zafman

(57) ABSTRACT

Disclosed herein is an apparatus for controlling a decision threshold voltage to an optical receiver, which is capable of automatically controlling the decision threshold voltage to the optical receiver appropriately to signal level decision on the basis of a low-frequency band signal component of an output signal from the optical receiver. The apparatus is adapted to control the level of the decision threshold voltage to the optical receiver, which converts an input optical signal into an electrical signal. To this end, the apparatus comprises a voltage detector for branching off part of the output signal from the optical receiver and detecting a corresponding voltage, a differential comparator for comparing the voltage detected by the voltage detector with a reference voltage inputted thereto and outputting the resulting differential voltage, a low pass filter for filtering the differential voltage from the differential comparator at a predetermined low frequency band and supplying the resulting voltage as the threshold voltage to the optical receiver, and a voltage controller for controlling the reference voltage to the differential comparator on the basis of a differential voltage between the threshold voltage from the low pass filter and a predetermined voltage corresponding to a predetermined minimum bit error rate.

3 Claims, 5 Drawing Sheets

U.S. PATENT DOCUMENTS

| | | | |
|---|---|---|---|
| 6,178,213 B1 | 1/2001 | McCormack et al. | |
| 6,242,732 B1 | 6/2001 | Rantakari | |
| 6,243,183 B1 | 6/2001 | Enfors et al. | |
| 6,262,411 B1 | 7/2001 | Chandrasekhar | |
| 6,275,959 B1 | 8/2001 | Ransijn | |
| 6,288,604 B1 * | 9/2001 | Shih et al. | 330/9 |
| 6,304,357 B1 * | 10/2001 | Ohhata et al. | 398/209 |
| 6,822,214 B2 * | 11/2004 | Han et al. | 250/214 R |
| 6,826,372 B1 * | 11/2004 | Givehchi | 398/209 |
| 6,885,828 B1 * | 4/2005 | Cornelius | 398/209 |
| 7,130,546 B2 * | 10/2006 | Nagatomo et al. | 398/210 |
| 2003/0016424 A1 * | 1/2003 | Nojima | 359/189 |
| 2005/0069333 A1 * | 3/2005 | Moeller | 398/202 |
| 2005/0082503 A1 * | 4/2005 | Patterson et al. | 251/129.04 |

OTHER PUBLICATIONS

Journal of Lightwave Technology, vol. 7, No. 11, Nov. 1989, pp. 1634-1640.

IEEE Photonics Technology Letters, vol. 5, No. 3, Mar. 1993, pp. 304-306.

IEEE Photonics Technology Letters, vol. 7, No. 10, Oct. 1995, pp. 1204-1206.

* cited by examiner ately controlling the decision threshold voltage to the optical receiver appropriately to signal level decision on the basis of a low-frequency band signal component of an output signal from the optical receiver so as to reduce a bit error rate, and being implemented in a simple manner at low cost.

2. Description of the Related Art

In general, an optical transmission system comprises an optical transmitter module for converting an electrical signal into an optical signal, an optical fiber cable for transmitting the optical signal from the optical transmitter module, a repeater for amplifying and transmitting the optical signal from the optical fiber cable in the middle of its transmission by the cable, and an optical receiver module for converting the optical signal amplified and transmitted by the repeater back to an electrical signal. The optical receiver module includes a clock/data recovery unit, which will hereinafter be described with reference to FIG. 1.

FIG. 1 is a block diagram showing the configuration of a conventional optical receiver module.

With reference to FIG. 1, the conventional optical receiver module includes an optical receiver 110 for converting an input optical signal Sin into an electrical signal, a clock/data recovery unit 120 for receiving an output signal Scout from the optical receiver 110 and recovering a clock and data contained in the received signal Scout, a bit error rate tester 130 for measuring a bit error rate of the data using a data signal SD and clock signal SC from the clock/data recovery unit 120, and a digital oscilloscope 140 for measuring a cross point of the output signal Scout from the optical receiver 110.

In order to measure optical transmission performance of the optical transmission system, there is a need to perform a photoelectric conversion function and a clock/data recovery function, respectively, using the optical receiver and the clock/data recovery unit. An optimum condition for level decision in the clock/data recovery unit, or an optimum 1/0 distribution condition, can be realized by optimally adjusting distributions of 1 and 0 levels of the electrical signal from the optical receiver.

FIG. 2 is a block diagram of the optical receiver 110 in FIG. 1.

With reference to FIG. 2, the optical receiver 110 includes a photodiode 111 for converting the input optical signal Sin into an electrical signal, a transimpedance amplifier 112 for amplifying the electrical signal photoelectrically converted by the photodiode 111 at a predetermined gain, and a limiting amplifier 113 for limiting an output signal from the transimpedance amplifier 112 to a predetermined level and outputting the resulting signal Scout.

The output signal Scout from the limiting amplifier 113 has a cross point adjustable with a direct current (DC) voltage inputted thereto. This signal Sout is also composed of two differential signal components Sout1 and Sout2 with opposite phases such that it is processable even when at a low level.

The signal Scout photoelectrically converted and outputted by the optical receiver 110 shows distributions of '1' and '0' signal levels on the basis of the cross point thereof, which is subject to a variation resulting from the DC voltage to the limiting amplifier 113. This output signal Scout will hereinafter be described with reference to FIGS. 3a, 3b and 3c.

FIGS. 3a, 3b and 3c are waveform diagrams showing level distributions of the output signal from the optical receiver 110 of FIG. 2.

Where the cross point of the output signal from the optical receiver 110 is 50% as shown in FIG. 3a, the output signal has a signal level '1' distribution S1D and a signal level '0' distribution S0D symmetrical to each other about the cross point. As a result, the signal level '1' distribution S1D and signal level '0' distribution S0D contain very small or consistent errors, so as to have substantially the same signal level '0' error distribution S0ED and signal level '1' error distribution S1ED at their one sides, respectively.

However, where the cross point of the output signal from the optical receiver 110 is not 50% as shown in FIGS. 3b and 3c, for example, where the output signal has a larger signal level '1' error distribution S1ED as shown in FIG. 3b, the probability of the output signal being decided to be '0' in level is higher although it must be decided to be originally '1' in level. On the contrary, where the output signal has a larger signal level '0' error distribution S0ED as shown in FIG. 3c, the probability of the output signal being decided to be '1' in level is higher although it must be decided to be originally '0' in level. That is, in the case where the signal cross point is not 50% as shown in FIGS. 3b and 3c, a larger amount of signal level decision errors take place in the process of data recovery by the clock/data recovery unit 120.

In particular, an optical signal is transmitted to the optical receiver via a plurality of optical amplifiers and a plurality of optical transmission lines. In this transmission process, the optical signal is compressed or spread due to dispersion and nonlinearity of the optical transmission lines. Further, noise is accumulated in level '1' data of the optical signal due to spontaneous emission noise of the optical amplifiers. As a result, it is hard for the clock/data recovery unit to electrically make an accurate distinction between the level 1 and the level 0.

Therefore, in order to obtain the best data characteristics, or the lowest bit error rate, there is a need to, ahead of others, optimally adjust distributions of levels, or '1' and '0' levels, of the electrical signal from the optical receiver.

SUMMARY OF THE INVENTION

Therefore, the present invention has been made in view of the above problems, and it is an object of the present invention to provide an apparatus for controlling a decision threshold voltage to an optical receiver, which is capable of automatically controlling the decision threshold voltage to the optical receiver appropriately to signal level decision on the basis of a low-frequency band signal component of an output signal from the optical receiver so as to reduce a bit error rate, and being implemented in a simple manner at low cost.

In accordance with the present invention, the above and other objects can be accomplished by the provision of an apparatus for controlling a level of a decision threshold voltage to an optical receiver, the optical receiver converting an input optical signal into an electrical signal, the apparatus comprising: a voltage detector for branching off part of an output signal from the optical receiver and detecting a corresponding voltage; a differential comparator for comparing the voltage detected by the voltage detector with a reference voltage inputted thereto and outputting the resulting differential voltage; a low pass filter for filtering the differential voltage from the differential comparator at a predetermined low frequency band and supplying the resulting voltage as the threshold voltage to the optical receiver; and a voltage controller for controlling the reference voltage to the differential comparator on the basis of a differential voltage between the threshold voltage from the low pass filter and a predetermined voltage corresponding to a predetermined minimum bit error rate; whereby the decision threshold voltage to the optical receiver is controlled such that it corresponds to the minimum bit error rate.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
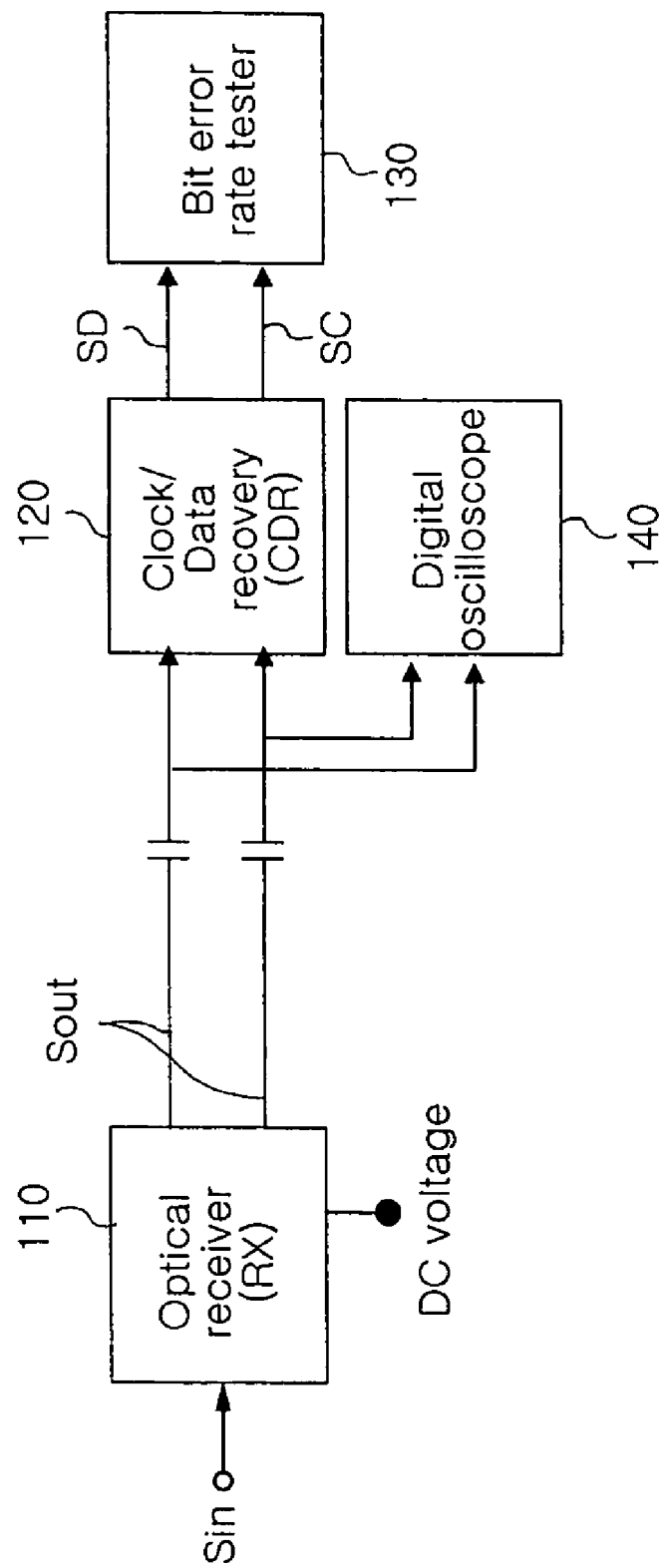
FIG. 1 is a block diagram showing the configuration of a conventional optical receiver module.
Figure 2:
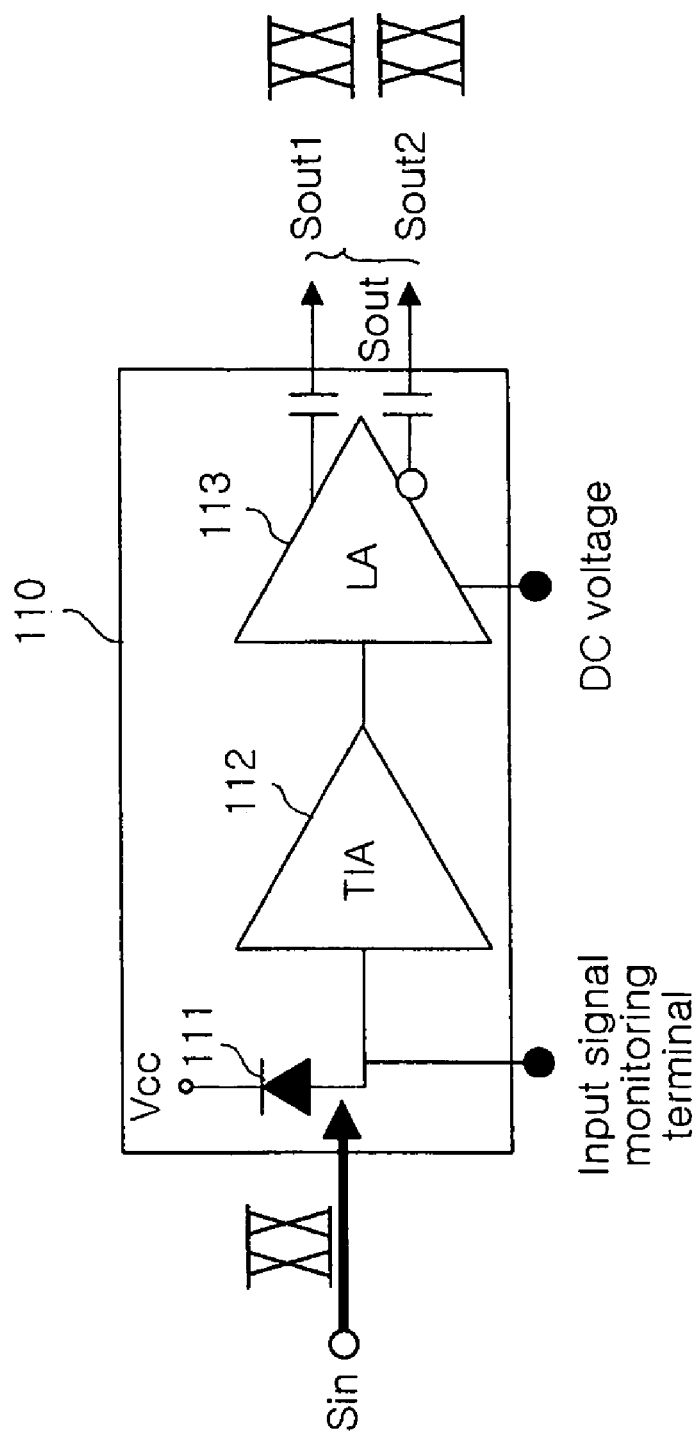
FIG. 2 is a block diagram showing the configuration of a conventional optical receiver.
Figure 3A:
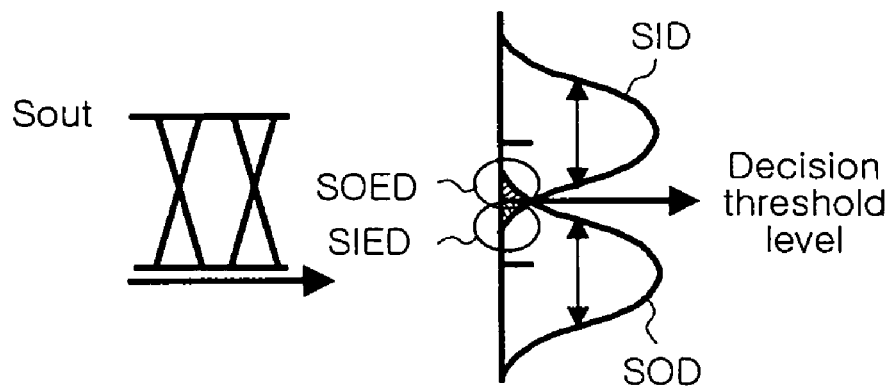
FIGS. 3a, 3b and 3c are waveform diagrams showing level distributions of an output signal from the optical receiver of FIG. 2.
Figure 3B:
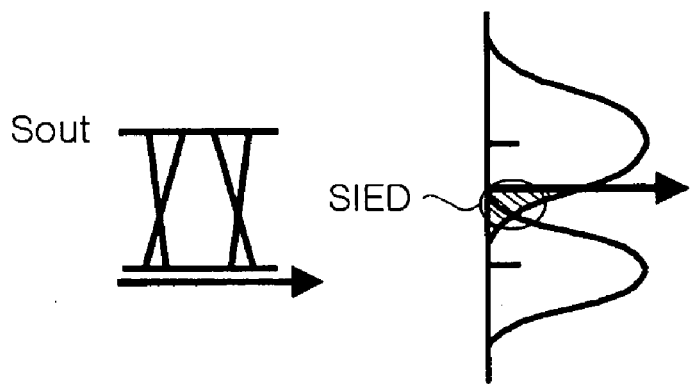
Figure 3C:
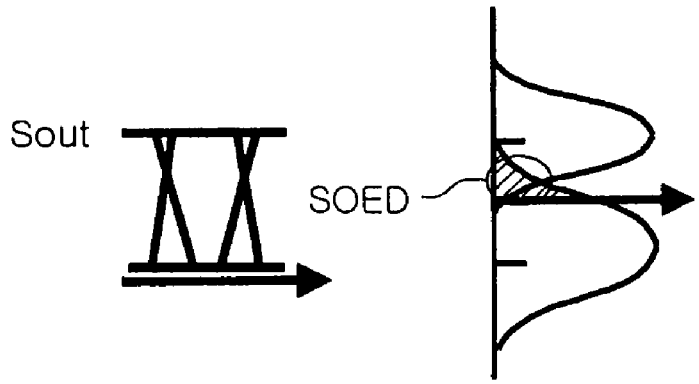

Now, preferred embodiments of the present invention will be described in detail with reference to the annexed drawings. In the drawings, the same or similar elements are denoted by the same reference numerals even though they are depicted in different drawings.

Figure 4:
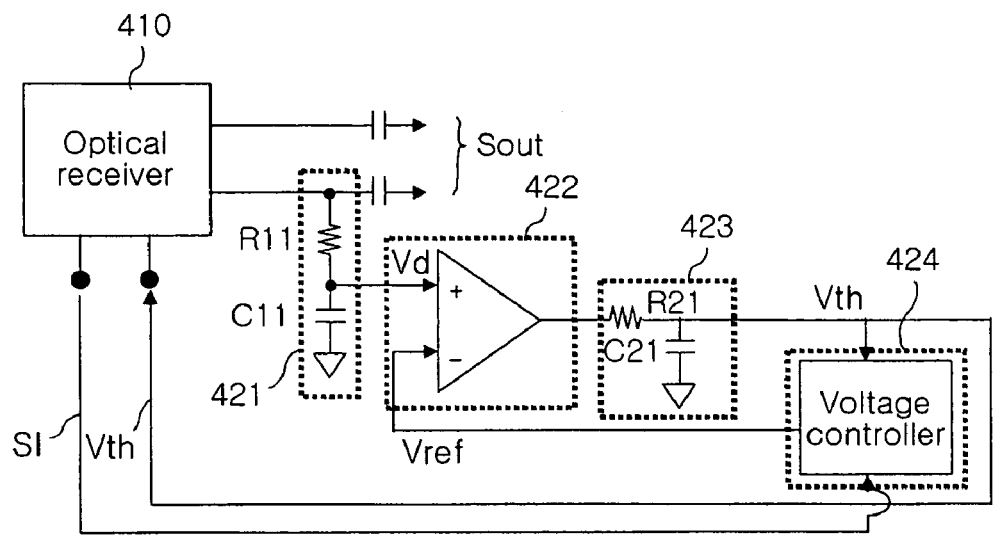
FIG. 4 is a block diagram showing the configuration of an apparatus for controlling a decision threshold voltage to an optical receiver according to the present invention.

FIG. 4 is a block diagram showing the configuration of an apparatus for controlling a decision threshold voltage to an optical receiver according to the present invention.

With reference to FIG. 4, the decision threshold voltage control apparatus according to the present invention is adapted to control the level of a decision threshold voltage to an optical receiver 410 that converts an input optical signal into an electrical signal, and comprises a voltage detector 421 for branching off part of an output signal from the optical receiver 410 and detecting a corresponding voltage Vd, a differential comparator 422 for comparing the voltage Vd detected by the voltage detector 421 with a reference voltage Vref inputted thereto and outputting the resulting differential voltage, a low pass filter 423 for filtering the differential voltage from the differential comparator 422 at a predetermined low frequency band and supplying the resulting voltage as the threshold voltage Vth to the optical receiver 410, and a voltage controller 424 for controlling the reference voltage Vref to the differential comparator 422 on the basis of a differential voltage between the threshold voltage Vth from the low pass filter 423 and a predetermined voltage corresponding to a predetermined minimum bit error rate.

In this manner, the decision threshold voltage control apparatus according to the present invention is configured to control the decision threshold voltage to the optical receiver such that it corresponds to the minimum bit error rate.

The voltage detector 421 is preferably composed of a low pass filter which branches off part of the output signal from the optical receiver 410 and filters the resulting signal at a predetermined low frequency band. This low pass filter may be implemented with, for example, a resistor R11 and a capacitor C11.

The low pass filter 423 is simply implemented with a resistor R21 and a capacitor C21.

The voltage controller 424 is preferably adapted to receive a photoelectrically converted input voltage from the optical receiver 410, perform its control operation if the level of the input voltage is higher than or equal to a predetermined signal input determination voltage level, and stop it if the input voltage level is lower than the predetermined signal input determination voltage level.

A detailed description will hereinafter be given of the operation of the decision threshold voltage control apparatus with the above-stated configuration according to the present invention in conjunction with the annexed drawings.

The decision threshold voltage control apparatus according to the present invention is capable of automatically controlling a decision threshold voltage to an optical receiver for an optical transmission system appropriately to signal level decision on the basis of a low-frequency band signal component of an output signal from the optical receiver so as to reduce a bit error rate, and being implemented in a simple manner at low cost, which will hereinafter be described with reference to FIGS. 4 to 6.

With reference to FIG. 4, first, the optical receiver 410 to which the present invention is applied converts an input optical signal into an electrical signal, which is then adjusted in level based on the threshold voltage so as to be outputted as a signal of '1' or '0' level with minimum bit error rate characteristics.

At this time, in the decision threshold voltage control apparatus of the present invention, the voltage detector 421 branches off part of the output signal from the optical receiver 410 and detects a corresponding voltage Vd. Note that the optical receiver 410 transmits its output signal at a predetermined data rate, for example, 10 Gbps or 12.5 Gbps. In this regard, there is a need to stabilize the signal transmitted at such a high data rate since it is too unstable to use as a voltage signal for comparison.

Therefore, the voltage detector 421 branches off part of the output signal from the optical receiver 410 and filters the resulting signal at a predetermined low frequency band, so as to detect a more stable, low frequency band voltage Vd and output the detected voltage Vd to the differential comparator 422.

The differential comparator 422 compares the voltage Vd detected by the voltage detector 421 with the reference voltage Vref inputted thereto and outputs the resulting differential voltage to the low pass filter 423.

The low pass filter 423 low pass filters the differential voltage from the differential comparator 422 and supplies the resulting voltage as the threshold voltage Vth to the optical receiver 410. This low pass filtering makes the threshold voltage Vth more stable. Thereafter, the optical receiver 410 adjusts a cross point for level decision of its output signal on the basis of the threshold voltage Vth.

The voltage controller 424 receives a photoelectrically converted input voltage SI from the optical receiver 410 and determines whether the level of the input voltage is higher than or equal to a predetermined signal input determination voltage level. Upon determining that the level of the input voltage is higher than or equal to the predetermined signal input determination voltage level, the voltage controller 424 recognizes the presence of an input signal and then performs its control operation. On the contrary, in the case where the level of the input voltage is determined to be lower than the predetermined signal input determination voltage level, the voltage controller 424 recognizes the absence of an input signal and then stops its control operation. This process is preferable in that unnecessary power consumption can be curtailed.

In operation, the voltage controller 424 controls the reference voltage Vref to the differential comparator 422 on the basis of a differential voltage between the threshold voltage Vth from the low pass filter 423 and a predetermined voltage corresponding to a predetermined minimum bit error rate. This process is repeated to control the threshold voltage such that it corresponds to the minimum bit error rate.

Figure 5:
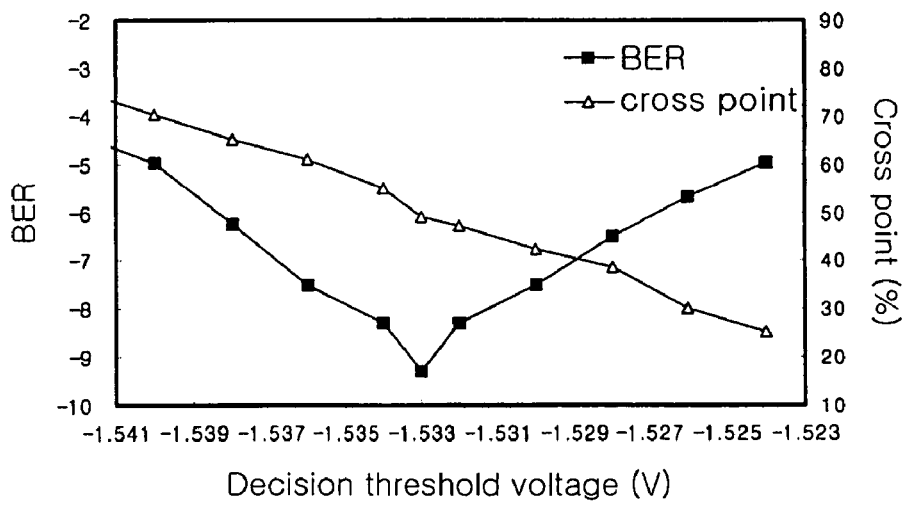
FIG. 5 is a graph showing decision threshold voltage-to-bit error rate and cross point characteristics according to the present invention.

FIG. 5 is a graph showing decision threshold voltage-to-bit error rate and cross point characteristics according to the present invention.

With reference to FIG. 5, the higher the threshold voltage to the optical receiver becomes, the lower the cross point becomes. At this time, the bit error rate decreases to its minimum value and again increases therefrom. In this connection, according to the present invention, the threshold voltage to the optical receiver is controlled to obtain the minimum bit error rate. That is, the voltage controller 424 controls the reference voltage to the differential comparator 422 such that the decision threshold voltage corresponds to the minimum bit error rate. It can be seen from FIG. 5 that, when the decision threshold voltage is −1.533V, the minimum bit error rate is obtained and the cross point is 50%. A predetermined voltage corresponding to the minimum bit error rate is set in the voltage controller 424.

Figure 6:
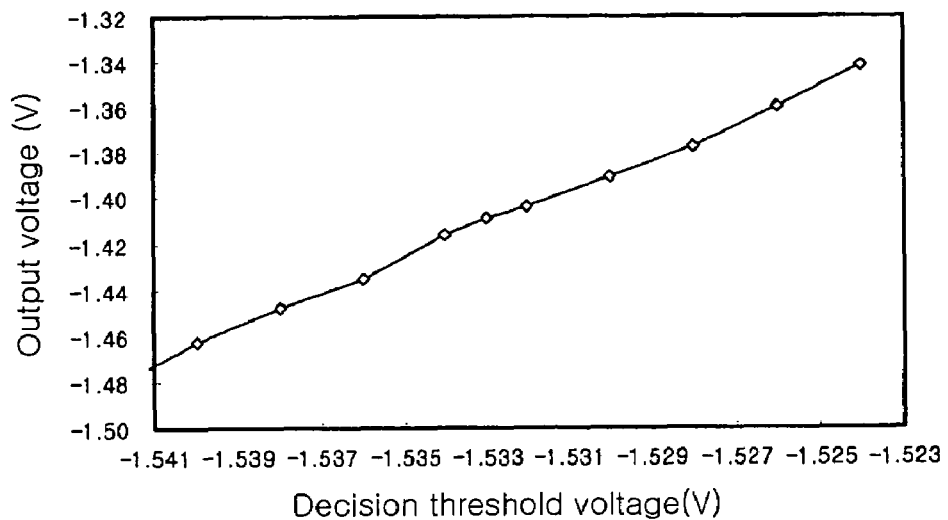
FIG. 6 is a graph showing decision threshold voltage-to-monitored voltage characteristics according to the present invention.

FIG. 6 is a graph showing decision threshold voltage-to-monitored voltage characteristics according to the present invention.

As can be seen from FIG. 6, if the decision threshold voltage increases with the reference voltage to the differential comparator 422, the output voltage from the optical receiver increases, too. This signifies that the higher the output voltage from the optical receiver becomes, the higher the threshold voltage becomes, too.

As stated above, according to the present invention, whenever the output voltage from the optical receiver varies, the reference voltage to the differential comparator and, in turn, the decision threshold voltage are adjusted so that the output voltage from the optical receiver can be constant in level. Through this control process, it is possible to adjust the cross point of the output signal from the optical receiver to 50% as shown in FIG. 5 and thus provide the output voltage corresponding to the minimum bit error rate.

In other words, the detected voltage Vd branched off from the output voltage from the optical receiver is monitored and the reference voltage Vref is adjusted in each variation of the detected voltage to adjust the threshold voltage Vth, so that the output voltage Scout from the optical receiver can be constant in level, namely, the cross point thereof can be adjusted to 50% as shown in FIG. 5, thereby enabling the output voltage to be controlled such that it corresponds to the minimum bit error rate.

Figure 7:
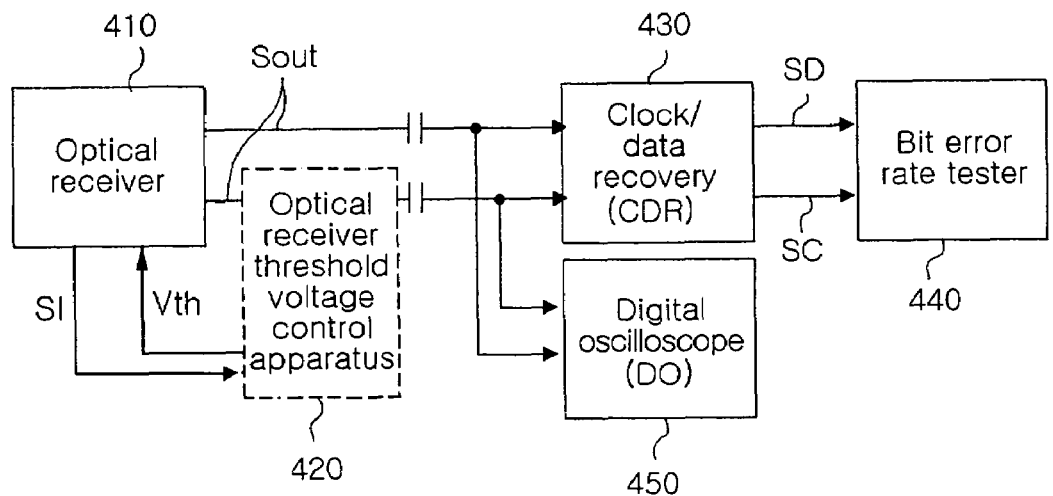
FIG. 7 is a block diagram showing the configuration of an optical transmission system to which the decision threshold voltage control apparatus of the present invention is applied.

FIG. 7 is a block diagram showing the configuration of an optical transmission system to which the decision threshold voltage control apparatus of the present invention is applied. As shown in this drawing, the decision threshold voltage to the optical receiver 410 is adjusted by the decision threshold voltage control apparatus of the present invention, which is denoted by the reference numeral 420, such that it corresponds to the minimum bit error rate. As a result, a clock/data recovery unit 430 can recover a clock and data more accurately, namely, at the minimum bit error rate, from the output voltage from the optical receiver 410. This can be confirmed through a bit error rate tester 440 and digital oscilloscope 450.

As apparent from the above description, the present invention provides an apparatus for controlling a decision threshold voltage to an optical receiver for an optical transmission system, which is capable of automatically controlling the decision threshold voltage to the optical receiver appropriately to signal level decision on the basis of a low-frequency band signal component of an output signal from the optical receiver so as to reduce a bit error rate, and being implemented in a simple manner at low cost.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for controlling a level of a decision threshold voltage to an optical receiver, said optical receiver converting an input optical signal into an electrical signal, said apparatus comprising:

a voltage detector for branching off part of an output signal from said optical receiver and detecting a corresponding voltage;

a differential comparator for comparing said voltage detected by said voltage detector with a reference voltage inputted thereto and outputting a resulting differential voltage;

a low pass filter for filtering said resulting differential voltage from said differential comparator at a predetermined low frequency band and supplying the resulting voltage as said threshold voltage to said optical receiver; and a voltage controller for controlling said reference voltage to said differential comparator on the basis of a differential voltage between said threshold voltage from said low pass filter and a predetermined voltage corresponding to a predetermined minimum bit error rate;

whereby said decision threshold voltage to said optical receiver is controlled such that it corresponds to said minimum bit error rate.

2. The apparatus as set forth in claim 1, wherein said voltage detector includes a second low pass filter, said second low pass filter branching off part of the output signal from said optical receiver and filtering the resulting signal at a predetermined low frequency band.

3. The apparatus as set forth in claim 1, wherein said voltage controller is adapted to receive a photoelectrically converted input voltage from said optical receiver, perform its control operation if a level of the input voltage is higher than or equal to a predetermined signal input determination voltage level, and stop it if the input voltage level is lower than the predetermined signal input determination voltage level.

* * * * *